Patented July 29, 1924.

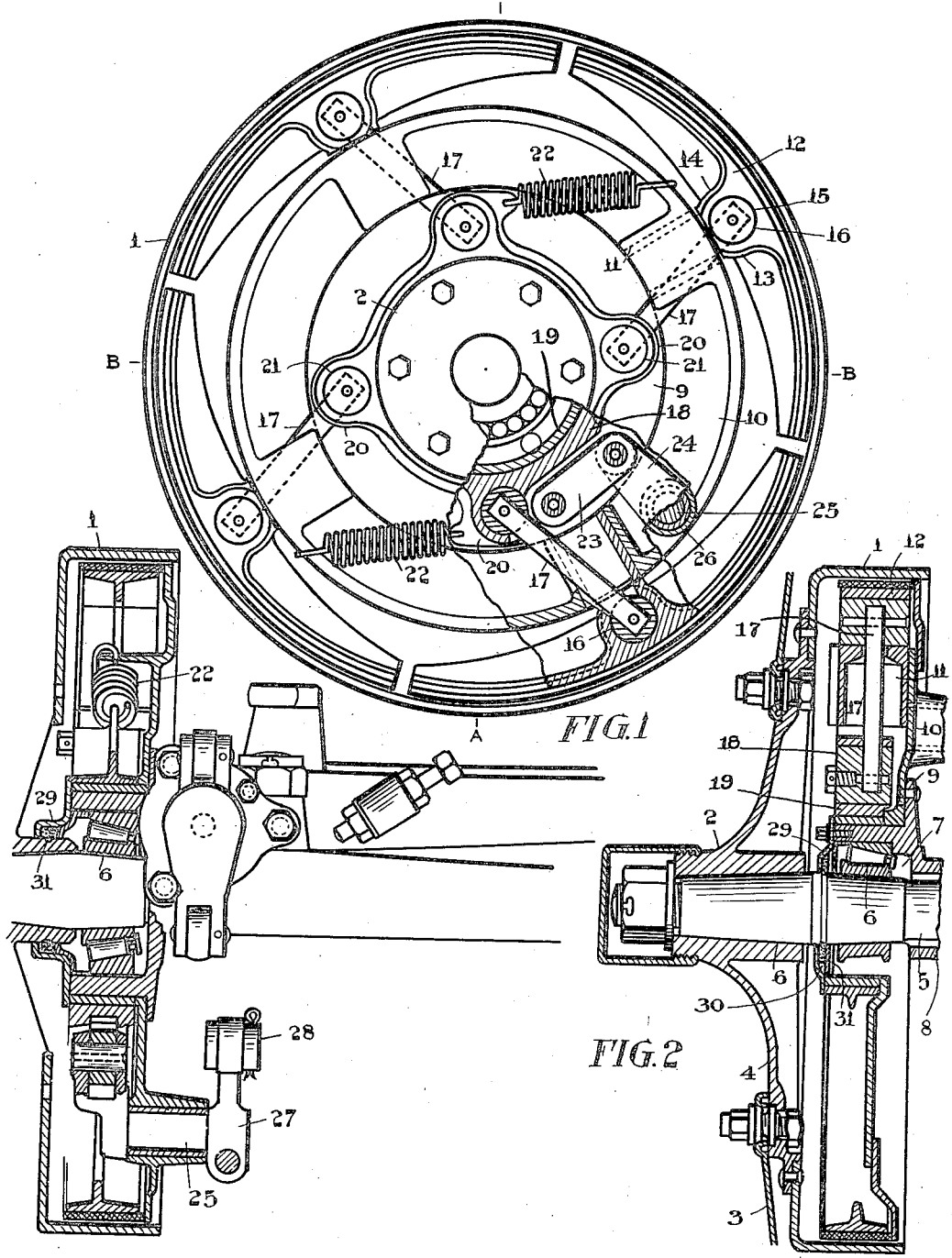

1,502,726

UNITED STATES PATENT OFFICE.

ALPHONSE JOSEPH LAVOIE, OF MONTREAL, QUEBEC, CANADA.

VEHICLE BRAKE.

Application filed November 30, 1921. Serial No. 518,747.

*To all whom it may concern:*

Be it known that I, ALPHONSE JOSEPH LAVOIE, a subject of the King of Great Britain, and residing at the city of Montreal, in the Province of Quebec, in the Dominion Canada, have invented new and useful Vehicle Brakes, of which the following is the specification.

The invention relates to vehicle brakes as described in the present specification and illustrated in the accompanying drawings that form part of the same.

The invention consists essentially of the novel features of construction pointed out broadly and specifically in the claim for novelty following a description in detail of the preferred form of the invention.

The objects of the invention are to simplify the construction in the operating mechanism for applying and releasing the brake shoes; to facilitate the repairs and replacements to brake parts by insuring accessibility to the mechanism; to furnish a braking device applicable to all wheels; and generally to provide durable, efficient and serviceable brakes and reduced cost in the manufacture.

In the drawings, Figure 1 is a plan view of the brake mechanism within the drum area.

Figure 2 is a cross sectional view through the drum and brake shoe mechanism on the line A—A in Figure 1.

Figure 3 is a cross sectional view through the drum and brake shoe mechanism on the line B—B in Figure 1.

Like numerals of reference indicate corresponding parts in the various figures.

Referring to the drawings, the brake drum 1 is rigidly secured to the hub 2 of the wheel 3 through the disc extension 4 from said hub, said hub being fixedly mounted on the rotating axle 5, journalled in the bearings 6 in the enlarged bearing recess 7 at each end of the axle housing 8, said housing at the inner end extending into the annular flange 9 for supporting the brake mechanism.

The brake mechanism frame 10 is rigidly secured to the flange 9 and is formed with radial guides 11, in which the brake shoes 12 are mounted through the extensions 13 from the central inner bosses 14 on said shoes, said bosses having the roller orifices 15 in which the rollers 16 are journalled.

The rollers 16 are pivotally secured to the connecting rods 17.

The operating ring 18 is mounted on the outside wall 19 of the bearing recess 7 and is rotatable thereon and is formed with the lugs 20 at intervals projecting from its outer side and having roller orifices therein in which the rollers 21 are journalled.

The connecting rods or thrust pins 17 at their inner ends are pivotally connected to the rollers 21 and extend between rollers in a direction intersecting radial lines to the centre of the drum area and are preferably arranged diametrically to one another.

The helical springs 22 normally hold the shoes from rubbing engagement with the drum 1 and at one end are secured to the lugs 20 and at the other end to the frame 10.

The link 23 is pivotally secured to the operating ring at one end and at the other end to the crank 24, from the crank shaft 25, which is journalled in the boss 26 projecting from the frame 10 said crank 25 having at its outer end the crank 27 which is joined by the rod 28 to the steering mechanism.

The bearing recess 7 is closed in by the cover 29, which is recessed from the inner side at 30 for the packing 31.

In the operation of the invention the outer crank on the crank shaft is operated by a pedal or other device in the front of the vehicle and this turns the operating ring on its bearing.

The turning of the operating ring swings the inner ends of the roller connecting rods and consequently the outer ends are moved outwardly and as these outer ends are connected to the rollers journalled in the bosses of the brake shoes, the latter are forced outwardly into contact with the brake drum and as the drum and wheel are rigidly joined together said wheel is retarded.

The turning back of the crank effects the release of the brake shoes from their frictional engagement with the drum and the springs maintain the shoes in their released position.

It will be seen that the power exerted on the brake shoes by the toggle joint arrangement of levers insures great pressure exerted with a minimum effort.

What I claim is:—

In a vehicle brake, the combination with a rotating axle and housing therefor and a wheel mounted thereon, of a brake drum rigidly secured to the wheel hub, and rotating therewith, a frame fixedly secured to said housing and forming a closure for the inner side of said drum and having a crank pin bearing, an operating ring rotatably mounted on said housing and having lugs and journal orifices brake shoes adapted to engage said drum and having inner central extension operating in radial slideways from said frame and journal orifices in said extension, rollers in said journal orifices in said lugs and extensions and having pivot pins extending therefrom, connecting bars pivotally mounted on said pins from said ring to said shoes, a crank pin mounted in said crank pin bearing, a link joining the crank of said pins to said operating ring and spring from said frame to said operating ring and normally maintaining said shoes in an inoperative position.

Signed at Montreal Canada this 22nd. day of November, 1921.

ALPHONSE JOSEPH LAVOIE.